Aug. 14, 1962 V. E. DE LYNN 3,049,042

GANGED ANCHORING NAIL DEVICE

Filed July 24, 1959

INVENTOR.
VICTOR E. DeLYNN
BY Blum, Moscovitz,
Friedman & Blum
ATTORNEYS 3,049,042
GANGED ANCHORING NAIL DEVICE
Victor E. De Lynn, 81 Ellwood Ave.,
Mount Vernon, N.Y.
Filed July 24, 1959, Ser. No. 829,298
4 Claims. (Cl. 85—13)

This invention relates to anchoring nails of the type designed to secure two wooden members in closely adjacent or substantially flush relation with the fastening elements concealed, and more particularly to an improved ganged anchoring nail device for this purpose.

In securing wooden panels to studding or other support surfaces, it is desirable, for a finished surface appearance, that the fastening or securing means be concealed. However, fastening devices arranged to be used in this manner, and as provided prior hereto, have not been satisfactory from the standpoint of providing firm anchorage of the parts to each other. Also, known fastening elements of this type have been difficult to apply and use.

In my co-pending application, Serial No. 798,196, filed March 9, 1959, for "Nail," now abandoned, I have shown and described a nail having a shank portion which has a collar intermediate its ends. The shank portion to one side of this collar may be driven into a suitable support member or other wooden member by means of a tubular or cylindrical nail set placed over the shank portion on the other side of the collar. This latter shank portion has a novel configuration including a point having one surface bevelled and the other surface concave outwardly and terminating in a barb spaced inwardly from the point. By virtue of the bevelled surface, when the outer element is forced over the point, this portion of the shank tends to curve and bend the outer element away from the bevelled surface. This provides a firm anchoring of the shank in the second or outer member secured to the nail. In addition, the barb on the pointed portion of the shank engages the wood fibers to firmly anchor the nail in the outer member and inhibit withdrawal of the nail therefrom.

While the device of my said co-pending application has proven very satisfactory in practice, particularly in securing relatively thick members together, the device described in the instant application is to be preferred in securing relatively thin panels, such as ¼" thick plywood, to a support surface, since a greater number of anchoring tabs are concentrated in a relatively small area, and splitting of the relatively weak plywood by a single nail is avoided. In addition, the instant device is comparatively inexpensive to manufacture and the need for a special driving device is eliminated.

In accordance with the present invention, a ganged nailing device having all of the anchoring features of my nail as shown in my said co-pending application, but much less expensive, greatly simplified in construction, and more easily applied, is provided in a novel manner. More particularly, the ganged nailing device is in the general form of a metal channel having flanges of a height somewhat less than the thickness of the outer member, such as a panel, to be hammered or impacted onto the ganged nailing device. The base of the ganged nailing device is centrally apertured to receive an ordinary nail or the like which secures the device to the underlying member, such as studding or the like.

The flanges are sub-divided by transverse slits into a plurality of tabs, such as three, for example, along each side. The respective tabs on each side are alternately bent somewhat inwardly and outwardly relative to a plane perpendicular to the base of the device, and laterally opposite tabs are bent in opposite directions. For example, the tabs at one end of the channel may both be bent somewhat outwardly, the intermediate tabs may be bent somewhat inwardly toward each other, and the tabs at the other end of the channel may be bent somewhat outwardly away from each other.

As an important feature, each of the tabs is provided with the aforementioned bevelled or chisel shaped point, with the bevels on adjacent tabs along each side of the channel facing in opposite directions. It is preferred that these bevels face oppositely to the direction in which the tabs are bent from a plane perpendicular to the base of the device. The tab side edges are further rounded off from each side of the point toward the base of the tabs.

Inwardly of the pointed end of each tab, a barb or lug is struck outwardly from the tab in the direction in which the tab is bent from the aforementioned plane perpendicular to the base of the device, these tabs having their outer ends extending toward the base. Thus, the barbs on adjacent tabs on each side of the device extend in opposite lateral directions but all of the barbs extend toward the base. The barbs extend from the surfaces of the tabs opposite those surfaces having the chisel points thereon.

This latter is an important feature of the invention as compared to prior art constructions. With the barbs projecting from the tab surfaces opposite those having the chisel point, and with the tabs curving away from their chisel points when driven into a member, the barbs are on the inside of the curve. Thus, when it is attempted to pull the members apart, the barbs are even more firmly interlocked over the wood fibers to strongly resist separation of the members. On the other hand, with the barbs on the outside of any curve, as in the prior art, the barbs are easily released from the fibers when the members are forced apart. In effect, in the present invention, the barbs follow paths through the wood which cannot be retraced.

In the modified form of the invention, the striking out of the barbs is done in such a manner that the surface of the tab opposite of that to which the barb projects is formed with a small projection or abutment which further assists the anchoring action.

In using the device, the base is nailed to the underlying member, such as studding or the like, and then the outer member is hammered downwardly over the tabs. As these tabs enter the outer member, they curve in a direction away from the bevelled or chisel points or edges to provide a firm anchoring of the outer member to the device. In effect, with the barbs following a non-retraceable path on the inside of the curve there is a spreading action equivalent to that of driving several nails at different angles into the outer member. The outwardly struck barbs on the inside of the curve prevent withdrawal of the outer member from the device, as, when it is attempted to spread the members apart, the barbs interlock with the fibers of the wood to an increasing degree. Preferably, the outer member is forced down onto the device to an extent such that the head of the nail anchoring the device to the inner member it at least somewhat embedded in the outer member. In the finished article, the two wooden members are spaced apart only by the relatively small thickness of the flange of the anchoring device, and such spacing is generally considered desirable in a number of applications, particularly in the anchoring of wooden panels to underlying wooden studding or the like.

The bending of the tabs out of planes normal to the base, and in opposite directions to such planes, together with the provision of the barbs, places the tabs and the barbs in a great many different areas of the wood, thus inhibiting splitting of the wood. In addition, the bending of the tabs alternately in opposite directions prevents flattening of the tabs when the second member or panel is hammered onto the nailing device.

For an understanding of the invention principles, reference is made to the following description of typical embodiments thereof as illustrated in the accompanying drawings. In the drawings.

Figure 1:
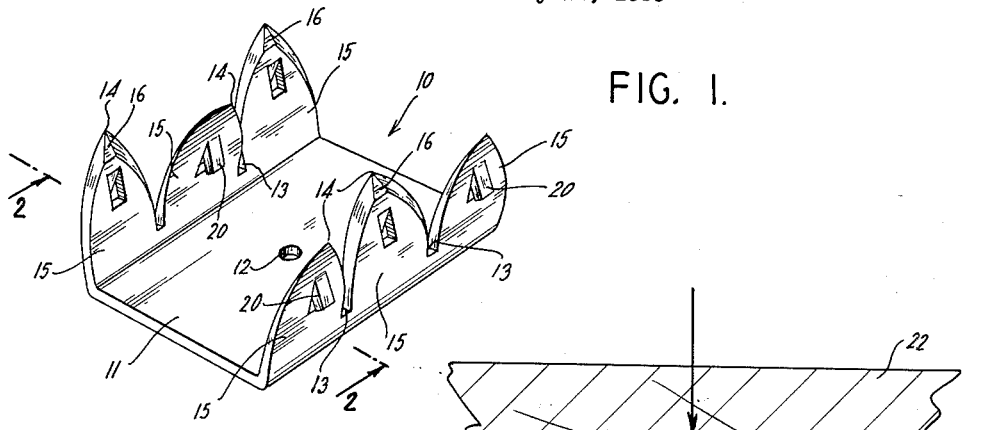
FIG. 1 is a perspective view of a ganged anchoring nail device embodying the invention.

Referring to FIG. 1, the ganged anchoring nail device 10 of the invention is stamped and otherwise formed from a piece of sheet metal to a generally channel shape including a base 11 having at least one aperture 12 centrally thereof. More than one such aperture may be provided in base 11 if desired.

In the formation of device 10, the "flanges" of the channel are die cut or the like to form individual tabs 15 separated from each other by spaces 13. Each tab 15, in elevation, has curved side edges which converge as indicated at 14. One surface of outer tab end 14 is bevelled to form a chisel shape surface as indicated at 16. Below ends 14, the tabs 15 have barbs, tongues, or lugs 20 struck partially outwardly from the tab surface opposite that having chisel edge 16 to extend outwardly and downwardly.

Figure 2:
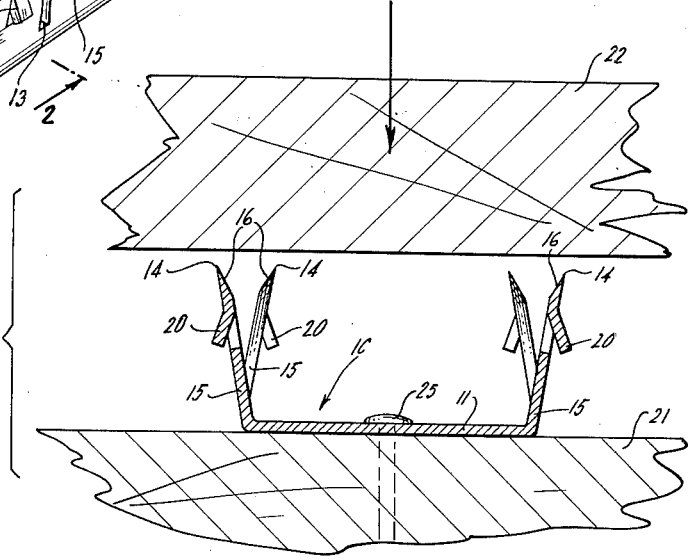
FIG. 2 is a section on the line 2—2 of FIG. 1 illustrating the device as secured to one member and before the second or outer member has been impressed thereon.

From FIGS. 1 and 2, it will be noted that adjacent tabs 15 along each edge of base 11 are bent away from a plane perpendicular to base 11 in opposite directions so that the tabs 15 extend at an angle to base 11. Thus, adjacent tab 15 on either side of base 11 diverge from each other. It will be noted that the bevelled or chisel surfaces 16 of the tabs face in a direction opposite to that in which the respective tab is bent. This is an important factor in the anchoring of the device 10, as will be explained more fully hereinafter.

It should be further noted that laterally opposite tabs 15 are either bent toward each other, in the case of the intermediate tabs shown in FIG. 1, or away from each other in the case of the end tabs shown in FIG. 1. If there were more than three pairs of laterally opposite tabs, the alternate pairs would be bent toward each other and the intermediate pairs would be bent away from each other. This factor is also of importance in the adequate anchoring of the device 10 into its attached member, as will be explained hereinafter.

Figure 3:
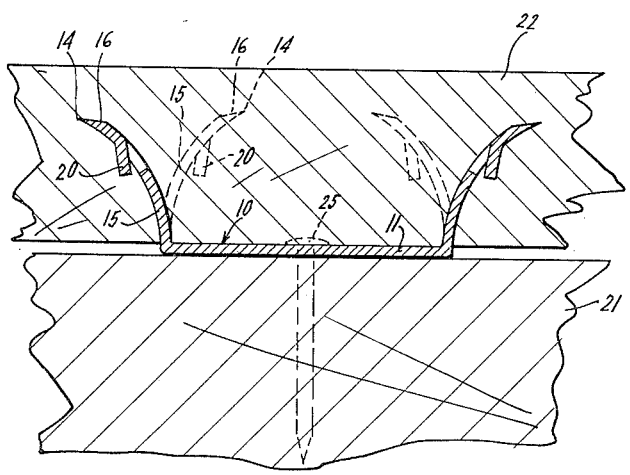
FIG. 3 is a view similar to FIG. 2 but showing the parts in their firmly anchored position.

Referring to FIGS. 2 and 3, in using the ganged anchor nail device 10, base 11 is secured to one member 21, such as studding or the like, by a nail or nails 25 driven through aperture or apertures 12 so that base 11 is flush against the outer surface of member 21. The parts are now in the position shown in FIG. 2. After device 10 is thus anchored to member 21, a second member, such as a wooden panel 22, is impacted or hammered downwardly over the pointed tabs 15. As tabs 15 enter member 22, they curve or bend, as indicated in FIG. 3, in a direction away from the bevelled surfaces 16, such curving being due to the action of the bevelled surfaces 16 bearing against the fibers of the wood in member 22. The adjacent tabs thus spread or diverge apart, with laterally opposite tabs either converging toward each other or diverging away from each other. This provides the spreading effect equivalent to a plurality of nails driven through members 21 and 22 at angles to each other and in planes intersecting each other.

Furthermore, after member 22 has been hammered or impacted firmly against base 11, with the head of nail 25 being at least partially embedded in member 22, the lugs 20, due to their hooking over or engaging the fibers of the wood on the inside of the curves, substantially prevent removal of member 22 from the nailing device. Accordingly, the members 21 and 22 are firmly anchored to each other in a substantially permanently interconnected relation, and with the devices 10 being concealed.

While the members 21 and 22 are spaced apart by the relatively small thickness of base 11, this is not undesirable in many applications, such as in the anchoring of wood paneling to wood studding.

The advantage of the invention arrangement is that, in a single operation, an anchoring effect, by concealed anchoring means, is provided which is the equivalent of a plurality of nails being driven at angles to each other to interconnect members 21 and 22. The barbs on the inside of the curves resist separation of the members by becoming more firmly interlocked with the wood fibers when it is attempted to pull device 10 out of member 22. Furthermore, the device 10 is inexpensive and simple to make and, due to the alternate bending of the tabs in opposite directions, will not split thin panels, such as ¼" plywood.

Figure 4:
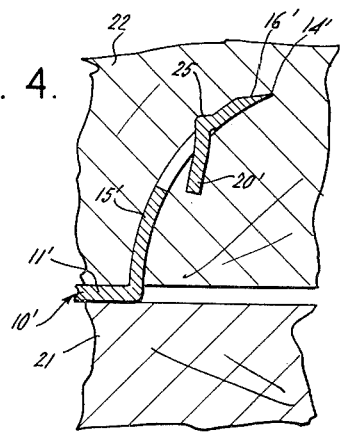
FIG. 4 is a partial sectional view, similar to FIG. 3, illustrating a modified form of anchoring device.

FIG. 4 shows a modified form of ganged nailing device 10'. In this case, in striking or punching out the lugs 25 from the tabs 15', the operation is performed in such a manner that a projection or abutment 25 is provided on the surfaces of the tabs 15' opposite to those surfaces from which the lugs 20' project. Otherwise, device 10' embodies the same features as device 10. This additional lug, abutment, or projection 25 augments the anchoring action of the tabs 15' in the member 22.

While specific embodiments of the invention has been shown in detail to illustrate the application of the invention principles, it should be understood that the invention may be embodied otherwise without departing from such principles.

What is claimed is:

1. A ganged anchoring nail device for concealed securement of two members to each other, said device comprising a generally channel shape metal member having a substantially flat base apertured to receive securing means for attaching said base to one member, and side flanges having longitudinally continuous portions extending along the sides of said base and having portions spaced from said base subdivided into individual tabs having generally pointed outer ends and arranged in laterally spaced pairs, longitudinally adjacent tabs on each side of the base being bent in opposite directions out of general plane perpendicular to the base, of the associated flange, the outer ends of said tabs being bevelled to a chisel edge on the side toward such plane; whereby, upon securement of said base flat against one of the members and impacting of the other member onto said tabs, said tabs will enter said other member and will follow curved paths therethrough which are convex in the direction of the chisel edges and, due to the chisel edges being alternately on opposite sides of adjacent tabs, adjacent tabs will curve in opposite directions in the second member; said tabs having lugs struck from the surfaces thereof opposite the surfaces having the chiseled edges, the lugs being inwardly of such outer ends and projecting toward the tab inner ends, the lugs further projecting from the inside of such curved paths to enhance resistance to withdrawal of the device from the second member.

2. A ganged anchoring nail device as claimed in claim 1 in which said tabs have convexly curved side edges converging to the outer ends of the tabs.

3. A ganged anchoring nail device as claimed in claim 2 in which said lugs extend inwardly toward the inner ends of the tab bases; said lugs engaging behind fibers of the second member to resist withdrawal of the latter from the device.

4. A ganged anchoring nail device as claimed in claim 3 in which said lugs are so formed that an abutment is provided at the base of each lug on the surface of the tab opposite to that from which the lug extends.

References Cited in the file of this patent

UNITED STATES PATENTS

| | | |
|---|---|---|
| 2,325,766 | Gisondi | Aug. 3, 1943 |
| 2,842,023 | Majewski | July 8, 1958 |
| 2,895,369 | Andersen | July 21, 1959 |

FOREIGN PATENTS

| | | |
|---|---|---|
| 1,016,865 | France | Sept. 3, 1952 |